United States Patent [19]

Albers

[11] 4,049,752

[45] Sept. 20, 1977

[54] POLYMERIC COMPOSITIONS OF STYRENE AND AMORPHOUS POLYOLEFINS USEFUL IN PREPARING HOT MELT ADHESIVES

[75] Inventor: Kenneth H. Albers, Longview, Tex.

[73] Assignee: Eastman Kodak Company, Rochester, N.Y.

[21] Appl. No.: 658,327

[22] Filed: Feb. 17, 1976

[51] Int. Cl.² ............ C08F 255/00; C08F 255/02; C08F 255/04; C08F 255/08
[52] U.S. Cl. ........................................... 260/878 R
[58] Field of Search ............................ 260/878 R

[56] References Cited

FOREIGN PATENT DOCUMENTS 553,779  6/1957  Belgium ........................ 260/878
1,054,062  1/1967  United Kingdom ............ 260/878

OTHER PUBLICATIONS

I + EC, vol. 58, No. 3, Mar. 1966, pp. 25–32, "Organic Peroxides".

*Primary Examiner*—Alan Holler
*Attorney, Agent, or Firm*—Clyde L. Tootle; Daniel B. Reece, III

[57] ABSTRACT

The present invention relates to novel polymeric compositions of styrene and amorphous polyolefins which include amorphous polypropylene, amorphous propylene/alpha-olefin copolymers and blends thereof and to processes for their preparation. These polymeric compositions are useful in preparing hot melt adhesives.

9 Claims, No Drawings

POLYMERIC COMPOSITIONS OF STYRENE AND AMORPHOUS POLYOLEFINS USEFUL IN PREPARING HOT MELT ADHESIVES

This invention relates to novel polymeric compositions of styrene and amorphous polyolefins and processes for preparing such polymeric compositions. More specifically it relates to polymeric compositions prepared by polymerizing styrene in the presence of amorphous polyolefins. One specific aspect of this invention relates to white polymeric compositions prepared by polymerizing styrene in the presence of amorphous polyolefins including amorphous polypropylene, amorphous propylene/alpha-olefin copolymers and blends thereof. Another specific aspect of this invention relates to clear polymeric compositions prepared by polymerizing styrene in the presence of amorphous polyolefins including amorphous polypropylene, amorphous propylene/alpha-olefin copolymers and blends thereof.

Hot melt adhesives based on amorphous polyolefins are widely used in industry for various applications. Although these adhesives are satisfactory for many applications, their color, which has been described as a stale urine color, prevents their full utilization in certain applications. For example, in certain consumer products such as disposable diapers, the brown or tan color of the hot melt adhesives presently used is not aesthetically pleasing. Therefore, it would be desirable to have adhesive compositions useful as hot melt adhesives which provide adhesives having a desirable pleasing color, such as white, or are clear.

It is, therefore, an object of the present invention to provide a novel polyolefin polymeric composition useful in preparing hot melt adhesives.

Another object of this invention is to provide a white amorphous polyolefin polymeric composition.

A further object of the present invention is to provide a process for preparing a nonpigmented, white amorphous polyolefin composition useful in preparing hot melt adhesives.

A still further object of this invention is to provide a clear styrenated amorphous polyolefin composition.

Further objects and advantages of the invention will be apparent to those skilled in the art from the accompanying disclosure and claims.

In accordance with one aspect of the present invention, it has been found that polymerizing styrene in the presence of amorphous polyolefins provides a novel white polymeric composition containing 1 to 90 weight percent styrene. This polymeric composition can be utilized as a hot melt adhesive or as a component of hot melt adhesives to provide white nonpigmented adhesives. Another aspect of the invention is the preparation of clear styrenated amorphous polyolefins which are also useful as adhesive or in preparing adhesives and also contain 1 to 90 weight percent styrene.

The amorphous polyolefins useful in preparing the compositions of this invention are amorphous polypropylene and amorphous propylene-α-monoolefin copolymers or mixtures of such amorphous polymers.

The amorphous polyolefins useful in preparing the compositions of this invention are essentially noncrystalline hexane soluble polyolefins having a melt viscosity at 190° C. of about 100 to about 500,000 centipoise or higher. The preferred amorphous polyolefins to be used in hot melt adhesives applications are solid amorphous polyolefins having a melt viscosity of about 1,000 to about 3,000 centipoise.

One preferred amorphous polypropylene is that obtained in the solution polymerization of propylene in the presence of stereospecific catalysts such as disclosed in U.S. Pat. No. 3,679,775. For example, propylene is polymerized at a temperature of about 150° C. and a pressure of about 1,000 psig with a catalyst such as lithium butyl-aluminum triethyl-titanium trichloride in a molar ratio of 0.5/0.5/1.0. The polymerization is conducted in the presence of a diluent such as mineral spirits which is a solvent for the polymer at the reaction temperature. The solvent solution produced which contains crystalline polymer and amorphous polymer is concentrated to form a solid crystalline and amorphous polymer concentrate which is then formed into pellets. These pellets are then extracted with a solvent such as hexane to obtain a hexane soluble amorphous polypropylene.

The hexane soluble amorphous propylene-α-monoolefin copolymers useful in preparing the compositions of this invention are formed in varying amounts during the production of crystalline propylene-α-monoolefin copolymers by stereospecific polymerization of propylene and a different α-monoolefin by a process such as disclosed in U.S. Pat. No. 3,529,037. Some of these amorphous copolymers can also be produced directly, i.e., without production of crystalline copolymer by stereospecific polymerization under appropriate process conditions. One example of such amorphous copolymers useful in the present invention is the amorphous propylenebutene copolymers containing from about 30 percent to about 75 weight percent butene-1. These copolymers and methods for their preparation are disclosed in U.S. Pat. No. 3,923,758.

The white styrenated amorphous polyolefin can be prepared by polymerizing styrene with the amorphous polyolefin in the presence or absence of a catalyst. However, the use of a catalyst is preferred to increase the reaction rate of the styrene polymerization. The amount of catalyst used can vary from none up to about 25 weight percent based on the weight of the styrene. Greater amounts of catalyst can be used, however, such greater amounts tend to degrade the product without increasing the styrene content or speed of polymerization. Moreover, the temperature at which the styrene can be polymerized is from the softening point temperature of the amorphous polyolefin up to about 300° C. to obtain a styrenated amorphous polyolefin containing from 1 to 90 weight percent styrene. The color of the styrenated amorphous polyolefin can be either clear or white depending on the amount of catalyst and temperature used in polymerizing the styrene. The clear styrenated amorphous polyolefin requires a substantial amount of catalyst and a moderate reaction temperature. For example, using di-t-butyl peroxide the clear styrenated amorphous polyolefin can be prepared by using the catalyst in an amount of from about 2 to 25 weight percent based on the weight of styrene and at a moderate polymerization temperature of from about 160° to about 210° C. At temperatures lower than 160° C. the white form of styrenated polyolefin is obtained, and at temperatures greater than 210° C., the white form is obtained. Also, without catalyst the white form is prepared even at temperatures of 160° to 210° C.

In preparing the polymeric compositions of our invention, the polymerization reaction is normally carried out in the melt phase by mixing the amorphous polyolefin, styrene, and catalyst in a well agitated vessel. If desired, the reaction can be carried out in solution by using an inert diluent which is a solvent for the amorphous polyolefin; however, the melt phase is preferred. The reaction is usually carried out at atmospheric pressure, however, higher pressures can be used if desired. Also, the styrene and catalyst can be added to the reaction mixture all at once or in small portions over a period of time.

The catalysts useful in the reaction are the free radical type with peroxides being preferred. Examples of such catalysts are cumene hydroperoxide and di-tertiary-butyl peroxide, most preferred catalyst being di-tertiary-butyl peroxide (di-t-butyl peroxide).

After the reaction is completed, unreacted styrene and volatile products of the reaction can be removed by stripping with an inert gas such as nitrogen or by vacuum stripping.

The polymeric compositions of this invention contain from about 1 to about 90 percent by weight styrene, preferably about 5 to about 60 percent by weight. The polymeric styrenated amorphous compositions have a viscosity at 190° C. of about 100 to about 50,000 centipoise, or higher.

In preparing the styrenated amorphous compounds of the present invention, other monomers were polymerized in the presence of amorphous polypropylene in an attempt to obtain a white polymeric composition that could be used in hot melt adhesives. Such monomers included butyl acrylate, diallyl phthalate, vinyl acetate, isopropenyl acetate, 2-ethylhexyl acrylate, allyl acetate, methyl methacrylate, acrylic acid, and methyl acrylate. However, none of these monomers produced white polymeric compositions.

Moreover, blends of polystyrene and amorphous polypropylene were also prepared in an attempt to obtain a white product. However, instead of a white product, a blend was obtained which contained small sand-like particles of polystyrene dispersed in the amorphous polypropylene when the two polymers were melt or solution blended.

Therefore, in view of the above results it was quite surprising and unexpected that white polymeric compositions were obtained when styrene was polymerized in the presence of amorphous polyolefins.

This invention will be further illustrated by the following examples although it will be understood that these examples are included merely for purposes of illustration and are not intended to limit the scope of the invention.

EXAMPLE 1

This example illustrates a process for the synthesis of compositions of this invention. A four-liter resin flask was fitted with an anchor blade stirrer, a water cooled condenser, a nitrogen gas purge system, a 1,000 milliliter pressure compensating addition funnel, a thermocouple inside an eighth-inch tube, and a thermometer between the resin flask and mantle which was attached to a Therm-o-watch temperature controller. The flask was charged with 800 grams of amorphous polypropylene (Thermosel viscosity = 1750 centipoise at 190° C., Gardner color = 3) which was heated with stirring to 200° C. The addition funnel was charged with 800 grams of styrene and 8 milliliters of cumene hydroperoxide.

The styrene and cumene hydroperoxide mixture was added dropwise during 2 hours at 200° C. and the reaction mixture was stirred an additional hour at 200° C. A fast nitrogen gas purge was then used to strip low boiling compounds from the product. After stripping, the product was poured into silicone paper trays. The product, a white solid, had a Thermosel viscosity at 190° C. of 27,500 centipoise and a styrene content (by nuclear magnetic resonance analysis) of 48 percent.

EXAMPLE 2

This example illustrates that the compositions of this invention can be synthesized at higher reaction temperatures. The same apparatus and chemicals in Example 1 were used. The reaction mixture was heated to 245° C. and the styrene and cumene hydroperoxide mixture was added during a 3 hour and 45 minute period at 245° C. The reaction mixture was stirred an additional hour at 245° C. and stripped of low boiling components as before. The white product had a Thermosel viscosity at 190° C. of 4,800 centipoise and a styrene content of 49 percent.

EXAMPLE 3

This example illustrates that the compositions of this invention can be produced without the addition of a free radical catalyst. The apparatus and chemicals were the same as Example 1 except that no cumene hydroperoxide was added. The amorphous polypropylene was heated with stirring to 200° C. and the styrene was added dropwise during 2 hours at 200° C. The reaction mixture was stirred an additional hour at 200° C. and stripped of low boiling components to produce a white polymeric product of 21 percent styrene content and 4,560 centipoise viscosity at 190° C.

EXAMPLE 4

This example illustrates that the compositions of this invention can be produced with low styrene content with all the reagents charged at the start of the reaction. A two-liter Parr autoclave was charged with 400 grams of amorphous polypropylene (Thermosel viscosity at 190° C. of 1,675 centipoise), 50 grams of styrene and 1.5 milliliters of cumene hydroperoxide. The reaction mixture was heated with stirring to 170° C. and held at this temperature for 1 hour. The crude product was transferred to a resin flask and stripped under vacuum of low boiling components. The product was "snow white," had a Thermosel viscosity at 190° C. of 2,250 centipoise, 7 percent styrene content by nuclear magnetic resonance analysis, a ring and ball softening point of 105° C., and was 99.4 percent nonvolatile.

EXAMPLE 5

This example illustrates that compositions of this invention having a high styrene content can be produced. A two-liter Parr autoclave was charged with 236 grams of amorphous polypropylene (Thermosel viscosity of 1,675 centipoise at 190° C.), 800 grams of styrene and 2 milliliters of cumene hydroperoxide. The reaction mixture was heated to 235° C. for 15 minutes with a peak pressure of 60 psig. The product was stripped of low boiling components to yield a "snow white" product containing 77 percent styrene and having a ring and ball softening point of 148° C.

EXAMPLE 6

This example illustrates that white polymeric compositions of styrene and amorphous propylene-α-monoolefin copolymers may be synthesized. A reaction apparatus identical to Example 1 is employed. The flask is charged with 800 grams of propylene-butene copolymer (31 percent butene, 1,500 centipoise at 190° C.) which is heated with stirring to 200° C. The addition funnel is charged with 100 grams of styrene and 1 milliliter of di-t-butyl peroxide. The styrene-catalyst mixture is added during 20 minutes at 200° C. and the reaction mixture is stirred an additional 30 minutes. A fast nitrogen gas purge is then used to strip low boiling compounds from the product. The white product has a Thermosel viscosity at 190° C. of 2,150 centipoise and a styrene content of 10 percent.

EXAMPLE 7

This example illustrates that white polymeric compositions of styrene and amorphous propylene-ethylene copolymers may be synthesized. A reaction apparatus identical to Example 1 is employed. The flask is charged with 800 grams of amorphous propylene-ethylene copolymer (Thermosel viscosity at 190° C. = 5,000 centipoise, 15 percent ethylene) which is heated with stirring to 210° C. The addition funnel is charged with 200 grams of styrene and 1 milliliter of di-t-butyl peroxide. The styrene-catalyst mixture is added during three hours at 210° C. and the reaction mixture is stirred an additional hour. A fast nitrogen gas purge is then used to strip low boiling compounds from the product. The product, a white solid, has a Thermosel viscosity at 190° C. = 6,700 centipoise and a styrene content of 17 percent.

The compositions of this invention are useful in the formulation of hot melt adhesives having improved color. In Table I the properties of adhesives containing the compositions of this invention as the major component are compared with adhesives containing amorphous polypropylene as the major component. The adhesives, containing the compositions of this invention have good adhesive properties and are white whereas the adhesives containing the amorphous polypropylene have a Gardner color of 4.

Table I

| Composition, % | Properties of Adhesives Based on Compositions of This Invention | | | | | |
|---|---|---|---|---|---|---|
| | Run 1 | Run 2 | Run 3 | Run 4 | Run 5 | Run 6 |
| Amorphous Polypropylene | — | — | 69.6 | — | — | 100.0 |
| Styrenated Amorphous Polypropylene | 70.0 | 99.8 | — | 99.8 | 70.0 | — |
| Hydrocarbon Resin[1] | 29.55 | — | 30.0 | — | 29.55 | 0 |
| Antioxidant[2] | — | 0.20 | 0.10 | 0.20 | 0.10 | — |
| Antioxidant[3] | 0.35 | — | 0.35 | — | 0.35 | 0 |
| Ring and Ball Softening Point, ° C. | — | 110 | 96 | 109 | — | 107 |
| % Styrene in Blend | 19 | 28 | 0 | 15 | 10 | 0 |
| Thermosel Viscosity cp at 350° F. | 3350 | — | 2250 | — | 2400 | 3850 |
| Thermosel Viscosity cp at 190° C. | — | 5200 | — | 3275 | — | — |
| Room Temperature Peel Strength Paper to Paper, grams | 1067 | 560 | 1123 | 490 | 1260 | 580 |
| Gardner Color | White | White | 4 | White | White | 4 |

[1]hydrocarbon resin having a softening point of 130° C. available commercially as Resin H-130 or resin having a softening point of 130° C. prepared according to the process disclosed in U.S. Patent 3,701,760.
[2]tetrakis[methylene(3,5-di-tert-butyl-4-hydroxyhydrocinnamate)methane]
[3]lauryl stearyl thiodipropionate In Table II the properties of adhesives containing minor amounts of compositions of this invention having a high styrene content are shown. These adhesives have good adhesive properties and are white whereas the control adhesive has a Gardner color of 3.

Table II

| Composition, % | Properties of Adhesives Containing Compositions of This Invention | | | |
|---|---|---|---|---|
| | Run 1 | Run 2 | Run 3 | Run 4 |
| Amorphous Polypropylene | 69.5 | 67.0 | 57.0 | 50.0 |
| Styrenated Amorphous Polypropylene | — | 10.0 | 20.0 | 20.0 |
| Resin H-130[1] | 22.55 | 22.55 | 22.55 | 29.55 |
| Antioxidant[2] | 0.45 | 0.45 | 0.45 | 0.45 |
| Piccotex LC[3] | 7.5 | — | — | — |
| % Styrene in Styrenated Amorphous Polypropylene | 0 | 54 | 54 | 54 |
| % Styrene in Blend | 0 | 5.4 | 10.8 | 10.8 |
| Ring & Ball Softening Point, ° C. | 94 | 98 | 100 | 100 |
| Thermosel Viscosity at 350° F., cp | 1550 | 1900 | 2200 | 2400 |
| Room Temperature Peel Strength Polyethylene to Polyethylene, grams | 960 | 1087 | 1023 | 1250 |
| Gardner Color | 3 | White | White | White |

[1]hydrocarbon resin having a softening point of 130° C.
[2]lauryl stearyl thiodipropionate
[3]alpha methyl styrene/vinyl toluene resin having a ring and ball softening point of 90° C. (Hercules, Inc.)

EXAMPLE 8

This example illustrates a process for the synthesis of compositions of this invention. A four liter resin flask was fitted with an anchor blade stirrer, a water cooled condenser, a nitrogen gas purge system, a 1,000 milliliter pressure compensating addition funnel, a Dean-Stark receiver, and a thermocouple inside an eight-inch tube. The flask was charged with 1,202 grams of amorphous polypropylene (Thermosel viscosity = 1,700 centipoise at 190° C., Gardner color = 3) which was heated with stirring to 200° C. The addition funnel was charged with 450 grams of styrene and 95 grams of di-tertiary-butyl peroxide.

The styrene and di-tertiary-butyl peroxide mixture was added dropwise at a rate of 8 milliliters per minute and the reaction mixture was stirred an additional five minutes. A fast nitrogen gas purge was then used to strip low boiling compounds from the product. After stripping, the product was poured into silicone paper trays. The product, a transparent solid, had a Thermosel viscosity at 190° C. of 4,688 centipoise and a styrene content (by nuclear magnetic resonance analysis of 24 percent).

Tensile bars of one-eighth inch thickness and one-half inch width were cast of the above product and of amorphous polypropylene (Thermosel viscosity at 190° C. =

1,700 centipoise). The tensile bars had the following properties.

|  | Example 8 | Amorphous Polypropylene |
|---|---|---|
| Tensile Strength, lb./in.$^2$ | 58 | 45 |
| Elongation, % | 1,733 | 60 |

EXAMPLE 9

This example illustrates a process for the synthesis of compositions of this invention having a low viscosity. A four liter resin flask was fitted with an anchor blade stirrer, a water cooled condenser, a nitrogen gas purge system, a 1,000 milliliter pressure compensating addition funnel, a Dean-Stark receiver, and a thermocouple inside an eight-inch tube. The flask was charged with 1,205 grams of amorphous polypropylene (Thermosel viscosity = 1,700 centipoise at 190° C., Gardner color = 3) which was heated with stirring to 225° C. The addition funnel was charged with 450 grams of styrene and 95 grams of di-tertiary-butyl peroxide.

The styrene and di-tertiary-butyl peroxide mixture was added dropwise at a rate of 8 milliliters per minute and the reaction mixture was stirred an additional five minutes. A fast nitrogen gas purge was then used to strip low boiling compounds from the product. After stripping, the product was poured into silicone paper trays. The product is a white solid, had a Thermosel viscosity at 190° C. of 163 centipoise and a styrene content (by nuclear magnetic resonance analysis of 25 percent). The room temperature peel strength of this product when used to band polyethylene film to polyethylene film was 740 grams.

EXAMPLE 10

This example illustrates that the compositions of this invention can be produced with lower styrene content and with a lower viscosity starting material. A reaction apparatus identical to Example 8 is employed. The flask is charged with 2,000 grams of amorphous polypropylene (viscosity at 190° C. = 1,700 centipoise) which is heated with stirring to 190° C. The addition funnel is charged with 30 milliliters of di-tertiary-butyl peroxide which is added during 10 minutes. The amorphous polypropylene viscosity is reduced to 575 centipoise at 190° C. The addition funnel is then charged with 180 grams of styrene and 39.5 grams of di-tertiary-butyl peroxide. The mixture is added dropwise during 20 minutes. The clear product was vacuum stripped to produce material with a Thermosel viscosity at 190° C. of 3,475 centipoise, 7 percent styrene content, and ring and ball softening point of 89° C. Tensile bars had a 140 percent elongation at break.

EXAMPLE 11

This example illustrates that the compositions of this invention can be produced with a lower catalyst level.

A reaction apparatus identical to Example 8 is employed. The flask is charged with 1,190 grams of amorphous polypropylene (viscosity at 190° C. = 1,700 centipoise) which is heated to 180° C. The addition funnel is charged with 207 grams of styrene and 11.5 grams of di-tertiary-butyl peroxide. The styrene catalyst mixture is added during 30 minutes and the reaction mixture is stirred an additional 30 minutes. A fast nitrogen gas purge is then used to strip low boiling compounds from the product. The clear product had a Thermosel viscosity at 190° C. of 2,325 centipoise, contained 16 percent styrene, had a tensile strength of 120 pounds per square inch, and an ultimate elongation of 240 percent.

EXAMPLE 12

This example illustrates that clear elastomeric compositions of styrene and amorphous propylene-ethylene copolymers may be synthesized. A reaction apparatus identical to Example 8 is employed. The flask is charged with 800 grams of amorphous propylene-ethylene copolymer (Thermosel viscosity at 190° C. = 5,000 centipoise, 15 percent ethylene) which is heated with stirring to 210° C. The addition funnel is charged with 200 grams of styrene and 40 grams of di-tertiary-butyl peroxide. The styrene catalyst mixture is added during one hour at 210° C. and the reaction mixture is stirred an additional hour. A fast nitrogen gas purge is then used to strip low boiling compounds from the product. The product, a clear solid, had a Thermosel viscosity at 190° C. = 3,700 centipoise and a styrene content of 14 percent. The product had a tensile strength of 225 psi and a 475 percent elongation.

EXAMPLE 13

This example illustrates that elastomeric compositions of styrene and amorphous propylene-alpha-monoolefin copolymers may be synthesized. A reaction apparatus identical to Example 8 is employed. The flask is charged with 800 grams of propylene-butene copolymer (31 percent butene, 1,500 centipoise at 190° C.) which is heated with stirring to 200° C. The addition funnel is charged with 100 grams of styrene and 23 grams of di-tertiary-butyl peroxide. The styrene catalyst mixture is added during 20 minutes at 200° C. and the reaction mixture is stirred an additional 30 minutes. A fast nitrogen gas purge is then used to strip low boiling components from the product. The product had a Thermosel viscosity at 190° C. of 3,400 centipoise and a styrene content of 9 percent. The tensile strength was 85 psi and the elongation was 460 percent.

EXAMPLE 14

This example illustrates that the compositions of this invention can be produced with a higher styrene content.

A reaction apparatus identical to Example 9 is employed. The flask is charged with 844 grams of amorphous polypropylene (viscosity at 190° C. = 1,700 centipoise) which is heated to 200° C. The addition funnel is charged with 333 grams of styrene and 82 grams of di-tertiary-butyl peroxide. The styrene catalyst mixture is added during 50 minutes and the reaction mixture is stirred an additional 30 minutes. A fast nitrogen gas purge is then used to strip low boiling compounds from the product. The clear product had a Thermosel viscosity at 190° C. of 3,600 centipoise and contained 28 percent styrene.

Table III

Some properties of adhesive containing a styrenated amorphous elastomeric polyolefin composition of this invention are as follows:

| Composition | Amount % | Amount % |
|---|---|---|
| Amorphous Polypropylene | 50 | |
| Elastomeric Styrene Amorphous Polypropylene Copolymer containing 28% Styrene, having 3,600 cp viscosity at 190° (prepared according to Example 14) | | 50 |
| Foral 105[1] | 15 | 15 |

Table III-continued

Some properties of adhesive containing a styrenated amorphous elastomeric polyolefin composition of this invention are as follows:

| Composition | Amount % | Amount % |
|---|---|---|
| 423S Polypropylene, having an I.V. of 1.52–1.76 and a F.R. of 2.71–5.50 | 1 | 1 |
| Kraton 1107[2] | 14.75 | 14.75 |
| Indopol H-1900[3] | 10 | 10 |
| Vistanex LM-MS[4] | 9 | 9 |
| Ethyl 702[5] | 0.25 | 0.25 |
| Thermosel Viscosity at 190° C., cp | 5,500 | 5,313 |
| Film to Film (Mylar), grams Peel Strength, Cohesive Failure: | 176 | 456 |

[1] pentaerythritol ester of highly hydrogenated rosin, ring and ball softening point of 94° C. (Hercules, Inc.)
[2] styrene-isoprene rubber 15/85 with 3100 psi tensile strength (Shell chemical Co.)
[3] polybutene with average molecular weight of 2,300, a density of 7.55 pounds per gallon, and specific gravity of 0.9065 (Amoco Chemical Corporation)
[4] polyisobutylene with average molecular weight (Staudinger) of 8,700–10,000 (Exxon Chemical Co.)
[5] 4,4'-methylenebis(2,6-di-tert-butylphenol)

The invention has been described in detail with particular reference to certain preferred embodiments thereof, but it will be understood that variations and modifications can be effected within the spirit and scope of the invention.

I claim:

1. A process for preparing polymeric compositions having a styrene content of about 1 to about 90 percent by weight of said compositions which comprises polymerizing styrene in the presence of an amorphous polyolefin having a melt viscosity at 190° C. of from about 100 to about 500,000 centipoise with a peroxide catalyst at a temperature in the range of about 160° to about 300° C.

2. The process of claim 1 wherein said amorphous polyolefin is a member of the group consisting of (1) amorphous polypropylene, (2) amorphous propylene-α-monoolefinic copolymer, or a mixture of (1) and (2).

3. The process of claim 2 wherein the peroxide catalyst is di-tertiary-butyl peroxide.

4. The process of claim 3 wherein said temperature is in the range of about 210° to about 300° C.

5. A process according to claim 4 wherein said amorphous polyolefin is amorphous polypropylene.

6. A process according to claim 5 wherein said peroxide is di-tert-butyl-peroxide.

7. A process according to claim 6 wherein said styrene content is from 5 to 60 percent by weight.

8. A white, nonpigmented polymeric polyolefin composition comprising an amorphous polyolefin which contains about 1 to 90 percent by weight polymerized styrene, has a melt viscosity at 190° C. of 100 to 500,000 centipoise prepared by polymerizing styrene in the presence of said amorphous polyolefin with a peroxide catalyst at a temperature of about 210° to about 300° C.

9. A polymeric polyolefin composition according to claim 8 which contains about 5 to 60 percent by weight polymerized styrene.

* * * * *